(12) United States Patent
Du et al.

(10) Patent No.: US 10,488,194 B2
(45) Date of Patent: Nov. 26, 2019

(54) MOTION MEASUREMENT METHOD AND APPARATUS APPLIED TO LARGE MULTI-PADDLE WAVE SIMULATION SYSTEM

(71) Applicant: DALIAN UNIVERSITY OF TECHNOLOGY, Dalian, Liaoning Province (CN)

(72) Inventors: Hai Du, Dalian (CN); Juan Meng, Dalian (CN); Muguo Li, Dalian (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 16/308,999

(22) PCT Filed: Sep. 11, 2017

(86) PCT No.: PCT/CN2017/101158
§ 371 (c)(1),
(2) Date: Dec. 11, 2018

(87) PCT Pub. No.: WO2018/166150
PCT Pub. Date: Sep. 20, 2018

(65) Prior Publication Data
US 2019/0310084 A1 Oct. 10, 2019

(30) Foreign Application Priority Data
Mar. 17, 2017 (CN) .......................... 2017 1 0153815

(51) Int. Cl.
*G01C 11/02* (2006.01)
*G01M 10/00* (2006.01)
*E02B 1/02* (2006.01)

(52) U.S. Cl.
CPC ................ *G01C 11/02* (2013.01); *E02B 1/02* (2013.01); *G01M 10/00* (2013.01)

(58) Field of Classification Search
None
See application file for complete search history.

(56) References Cited

U.S. PATENT DOCUMENTS 4,229,969 A * 10/1980 Hark ...................... G01M 10/00
4/491
4,406,162 A * 9/1983 Hark ...................... G01M 10/00
4/491

(Continued)

FOREIGN PATENT DOCUMENTS

CN 103019155 A 4/2013
CN 103631190 A 3/2014

(Continued)

*Primary Examiner* — Christopher G Findley
(74) *Attorney, Agent, or Firm* — Muncy, Geissler, Olds & Lowe, P.C.

(57) ABSTRACT

The present invention belongs to the technical field of image measurement, and provides a motion measurement method and apparatus applied to a large multi-paddle wave simulation system. When the motion of the wave maker is measured, firstly site images are collected by the cameras; the mark point on each wave making paddle in the image processing boards is identified; and a central position is computed. Then, the central position is contrasted with the initial position to calculate displacement of the image plane and convert the displacement into the displacement on a physical space in combination with calibration parameters. Next, data is transmitted to the computer through the EtherCAT network, and coded identification is conducted on the data. Finally, comparative analysis is conducted on a measured value and a target value of the motion of the wave making paddle in the computer, thereby obtaining motion information of the wave maker. In the present invention, when the motion of the wave maker is measured, the problems of difficult target recognition and unstable motion tracking caused by nonuniform illumination in the experi- (Continued)

ment site as well as the problems of great time consumption of an image analysis algorithm and low efficiency of data transmission of multiple camera systems are fully considered.

3 Claims, 1 Drawing Sheet

(56) References Cited

U.S. PATENT DOCUMENTS

| | | | | |
|---|---|---|---|---|
| 6,611,970 B2* | 9/2003 | Back | .................. | A47K 3/10 4/491 |
| 2018/0251992 A1* | 9/2018 | Gleason | .................. | E02B 1/02 |

FOREIGN PATENT DOCUMENTS

| | | | |
|---|---|---|---|
| CN | 105806319 A | 7/2016 |
| CN | 106353070 A | 1/2017 |
| CN | 106840110 A | 6/2017 |
| EP | 2835784 A1 | 2/2015 |

\* cited by examiner

MOTION MEASUREMENT METHOD AND APPARATUS APPLIED TO LARGE MULTI-PADDLE WAVE SIMULATION SYSTEM

TECHNICAL FIELD

The present invention belongs to the technical field of image measurement, relates to problems of real-time acquisition of positions of wave making paddles in a large wave simulation system as well as test and assess of a combined motion curve, and particularly relates to a design method for an image measurement system based on an EtherCAT network.

BACKGROUND

A wave simulation system (also called a wave maker system) is an essential environment simulation device in an ocean engineering laboratory. Regular waves and irregular waves can be generated mutually in limited pools and tanks of the laboratory through use of the wave maker, so as to provide a simulation environment of experimental verification for development of marine equipment.

When wave maker is used for wave simulation, an experimenter firstly sets wave parameters according to a target spectrum; then, the motion curve of each wave making paddle is calculated according to a system transfer function, and a corresponding control signal is generated; next, the information is transmitted into a controller; subsequently, the controller controls a servo axis connected with the controller to move according to the received motion information; and finally, the wave making paddles move back and forth under the drive of the servo axis, thereby producing waves of different forms. It is observed from this process that the precision of wave simulation completely depends on the precision of control over wave making motion. However, the wave making process is a linkage process of a plurality of wave making paddles. The motion value of each wave making paddle is a discrete sampling point of the wave making motion curve in spatial distribution. In addition, not all of the wave making paddles in a multi-plate wave maker are operated under one clock, i.e., a precision problem of synchronous control exists in the motion process of the wave making paddles.

To solve evaluation problem of the motion control performance of the wave making paddles in the development process and the wave making experimentation process of the wave maker, a method of human eye observation and a method of a laser displacement sensor are often adopted in practice. Both of the methods can partially solve some site test and evaluation problems, but have great problems in time control precision, quantity of wave making paddles to be measured simultaneously, experiment measurement cost and convenience (degree of operation. Therefore, a measurement method and apparatus applied to a multi-plate wave simulation system is urgently needed to synchronously acquire instant position information of all the wave making paddles in real time. An image measurement method has the characteristics of high precision, no disturbance, full-field measurement and visual information. In addition, an image measurement system constructed after integrating the technology with an EtherCAT data acquisition technology not only has the characteristic of the image measurement technology, but also has the characteristics of simple site wiring, large range of field of view, convenient installation and high data transmission efficiency, and is especially suitable for constructing the motion measurement system of the large multi-plate wave simulation system.

SUMMARY

In view of a monitoring problem of an operating state of a wave making system in an ocean engineering laboratory, the present invention proposes a motion measurement method and apparatus applied to a large multi-paddle wave simulation system by combining a motion measurement and image processing technology of a wave making paddle with EtherCAT network technology.

The technical solution of the present invention is as follows:

A motion measurement apparatus applied to a large multi-paddle wave simulation system is provided. The motion measurement apparatus comprises a computer, cameras, infrared light supplementing apparatuses, round fluorescent mark points and EtherCAT image processing circuit boards, wherein the cameras are infrared enhanced industrial cameras with fixed focus lenses, and the quantity of the cameras is determined by a measurement range; the quantity of the infrared light supplementing apparatuses is determined by the needs of imaging conditions; and the quantity of the EtherCAT image processing boards is consistent with the quantity of the cameras.

The motion measurement apparatus adopts a data acquisition structure based on EtherCAT network; the computer is used as a master station of the EtherCAT network; the cameras are arranged above a wave making system; under the condition of satisfying the requirement for measurement precision, a field of view covers all wave making paddles; when a single camera cannot cover a measured region, a manner that a plurality of cameras are operated jointly is adopted; each camera is connected with each EtherCAT image processing board through a CameraLink interface as a slave station of the EtherCAT network; a Trig interface of each EtherCAT image processing board is mutually connected together; the first EtherCAT image processing board is connected with the computer through a RJ45 network interface; the EtherCAT image processing board of each camera is mutually connected together through the RJ45 network interface; the infrared light supplementing apparatuses are put at one side of the cameras for illuminating the site; the quantity of the infrared light supplementing apparatuses is selected according to the site imaging quality; and the round fluorescent mark points are pasted or smeared on connecting plates of the wave making paddles. When the motion of the wave maker is measured, firstly site images are collected by the cameras; the mark point on each wave making paddle in the image processing boards is identified; and a central position is computed. Then, the central position is contrasted with the initial position to calculate displacement of the image plane and convert the displacement into the displacement on a physical space in combination with calibration parameters. Next, data is transmitted to the computer through the EtherCAT network, and coded identification is conducted on the data. Finally, comparative analysis is conducted on a measured value and a target value of the motion of the wave making paddle in the computer, thereby obtaining motion information of the wave maker.

The infrared light supplementing apparatuses are 850 nm infrared light supplementing lamps.

A motion measurement method applied to a large multi-paddle wave simulation system comprises the following steps:

step A: installing the cameras directly above the wave maker; selecting the quantity of the cameras according to measurement precision, camera resolution and the measurement range; connecting the EtherCAT image processing boards mutually and then connecting with the computer to form a data acquisition structure based on EtherCAT network; fixing the round fluorescent mark points to the connecting plates above the wave making paddles; arranging four auxiliary identification points in a 4-neighborhood arrangement manner, i.e., along the axial operation direction of the wave making paddles at places which allow the same distance from the top, the bottom, the left and the right of the mark points; adjusting the positions of the cameras so that the arrangement directions of the mark points are consistent with the row and column directions of a shot image; disposing the cameras to be an external triggering mode through the EtherCAT image processing boards; and unifying trigger signals by the EtherCAT image processing boards through the Trig interface while sending consistent synchronous trigger acquisition signals to respective cameras;

step B: performing system calibration during first operation when the arrangement of the cameras is completed; shooting an image respectively in an initial position and a maximum stroke position of the wave making paddles; conducting image binarization and round target extraction on the collected images by the EtherCAT image processing boards; establishing a lookup table for motion image information of each wave making paddle; recording a ratio of a physical distance of a motion stroke of the wave making paddle to an image plane distance, $K_i$, i=1, 2, - - - N, wherein N is the quantity of the wave making paddles on an image plane; simultaneously recording a motion range of the mark points as well as image coordinates at a starting point and a terminal point of a moving track of a center mark point; numbering each wave making paddle on the image plane in an order from left to right, and storing the calibration information in storage spaces of the image processing boards according to the numbers;

step C: conducting image acquisition for the site of the current time; collecting image data in the EtherCAT image processing boards by FPGA into a storage unit; then, conducting data processing on the images in the storage regions by DSP on the EtherCAT image processing boards; firstly, extracting all the mark points within the motion range of each wave making paddle; then distinguishing each extraction point on a motion section line of the center mark point recorded in a calibration process; considering the point as a correct mark point only when an adjacent point exists respectively on the top, bottom, left and right of the current point next, subtracting the recorded initial position from the coordinate of the mark point, thereby obtaining image displacement of motion of the wave making paddle; subsequently multiplying the value by $K_i$ to obtain a physical displacement value; obtaining displacement information of each wave making paddle on each image after completing image analysis of each wave making paddle; and finally, constructing a sub-message by the EtherCAT image processing boards for the motion information of the wave making paddles in the images in a manner of 'numbers &displacement', and feeding back the sub-message to the computer through the EtherCAT network;

step D: extracting, by the computer, messages transmitted by image processing cards; and renumbering the data in the messages according to the numbers of the slave station so that the number of the push paddle motion information of each wave maker is unique and each wave maker is successively arranged in accordance with a spatial position relationship;

step E: analyzing the displacement information of the wave making paddle by the computer: arranging the displacement data of each wave making paddle in the order of the numbers to form a measurement data curve; and meanwhile, calculating a difference value between a measured data curve and a target data curve at the current time, counting a maximum difference value and a mean difference value and drawing an error curve for operation of each wave making paddle for facilitating an experimenter in detecting the control precision of the wave maker;

step F: repeating step C to step E until the measurement of wave making motion is ended.

In conclusion, a dot matrix of the round mark points is firstly arranged on the connecting plates of the wave making paddles before measurement; then the cameras are arranged directly above the wave maker and system calibration is conducted; next, measurement is started; during measurement, discrimination and center extraction of the mark points are conducted through the image processing boards; next, the displacement is calculated through the calibration parameters and is transmitted to the computer through the EtherCAT network for numbering; and finally, the measured data and the target data are contrasted in the computer, thereby obtaining motion control information of the wave making paddles.

The present invention has the beneficial effects: when the motion of the wave maker is measured, the problems of difficult target recognition and unstable motion tracking caused by nonuniform illumination in the experiment site as well as the problems of great time consumption of an image analysis algorithm and low efficiency of data transmission of multiple camera systems are fully considered. The robustness of target tracking is enhanced through the matching of the infrared spectrum and the dot matrix of the mark points; and a manner of combining calculation by hardware of the image processing boards with the EtherCAT network is adopted, thereby not only increasing image measurement speed, but also greatly increasing the data transmission efficiency and greatly promoting application and extension of the image measurement technology in research design of the wave maker.

In the figures: 1 computer; 2 camera; 3 EtherCAT image processing board; 4 infrared light supplementing apparatus; 5 round fluorescent mark point; 6 connecting plate; and 7 wave making paddle.

DETAILED DESCRIPTION

Specific embodiments of the present invention are further described below in combination with accompanying drawings and the technical solution.

Figure 1:
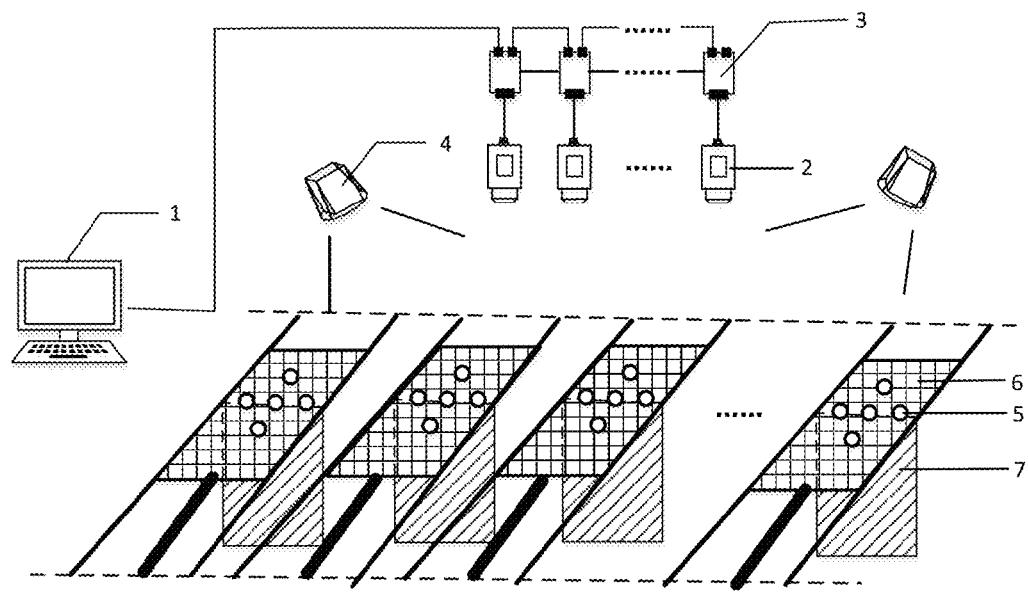
FIG. 1 is a structural schematic diagram of the present invention.
Figure 2:
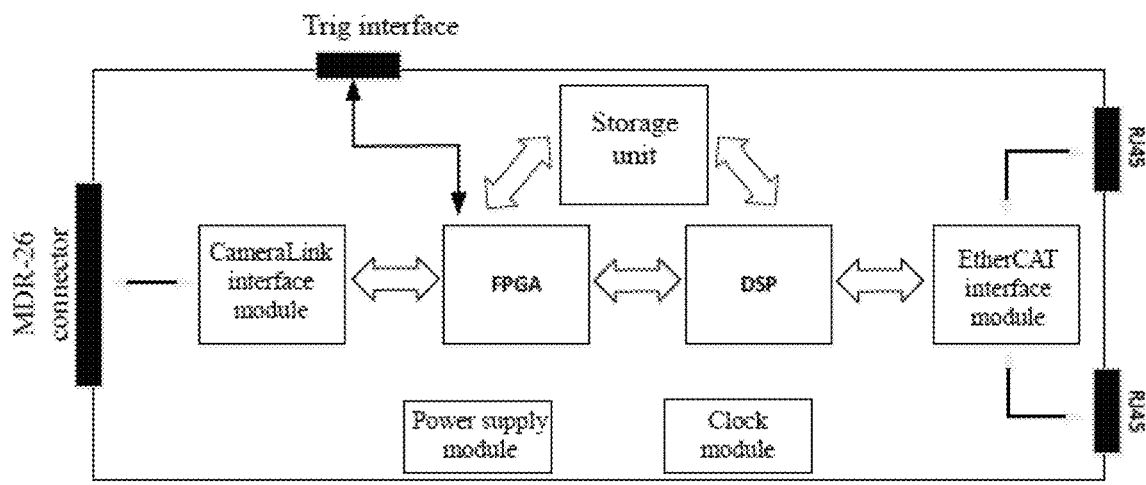
FIG. 2 is a structural schematic diagram of an image processing board.

A motion measurement method and apparatus applied to a large multi-paddle wave simulation system are provided. The structural schematic diagram is shown in FIG. 1:

The motion measurement apparatus comprises a computer 1, infrared enhanced industrial cameras 2 with fixed focus lenses (the quantity is determined by a measurement range), infrared light supplementing apparatuses 4 (the quantity is determined by site imaging conditions), a plurality of round fluorescent mark points 5 and EtherCAT image processing boards 3 (the quantity is consistent with the quantity of the cameras). The entire measurement system adopts a construction form of an EtherCAT network, wherein the computer 1 is used as a master station of the measurement network. The infrared enhanced industrial cameras 2 are arranged above a wave making system; and under the condition of satisfying the requirement for measurement precision, a field of view covers all wave making paddles 7 as much as possible. When a single camera cannot cover a measured region, a manner that a plurality of cameras 2 are operated jointly is adopted. Each camera 2 is connected with each EtherCAT image processing board 3 through a Camera Link interface as a slave station of the EtherCAT network. The first image processing board 3 is connected with the computer 1 through a RJ45 network interface. The EtherCAT image processing board 3 of each camera 2 is mutually connected together through the RJ45 network interface. In addition, to ensure synchronization precision of the cameras 2, the Trig interface of each EtherCAT image processing board 3 is connected together. The 850 nm infrared light supplementing lamps are put at one side of the cameras 2 for illuminating the site; and the quantity of the infrared light supplementing lamps is selected according to the site imaging quality. The round fluorescent mark points 5 may be pasted or smeared on connecting plates 6 of the wave making paddles 7. When the motion of the wave maker is measured, firstly site images are collected by the cameras 2; the round fluorescent mark point 5 on each wave making paddle 7 in the EtherCAT image processing boards 3 is identified; and a central position is computed. Then, the central position is contrasted with the initial position to calculate displacement of the image plane and convert the displacement into the displacement on a physical space in combination with calibration parameters. Next, data is transmitted to the computer through the EtherCAT network, and coded identification is conducted on the data. Finally, comparative analysis is conducted on a measured value and a target value of the motion of the wave making paddle 7 in the computer 1, thereby obtaining motion information of the wave maker. The specific method is described as follows:

step A: installing the cameras 2 directly above the wave maker; selecting the quantity of the cameras 2 according to measurement precision, camera resolution and the measurement range; connecting the EtherCAT image processing boards 3 mutually and then connecting with the computer 1 to form a data acquisition structure based on EtherCAT network; meanwhile, fixing the fluorescent mark points 5 to the connecting plates 6 above the wave making paddles 7; arranging four auxiliary identification points in a 4-neighborhood arrangement manner, i.e., along the axial operation direction of the wave making paddles at places which allow the same distance from the top, the bottom, the left and the right of the mark points; later, adjusting the positions of the cameras 2 so that the arrangement directions of the mark points are consistent with the row and column directions of a shot image; disposing the cameras 2 to be an external triggering mode through the EtherCAT image processing boards 3; and unifying trigger signals by the EtherCAT image processing boards 3 through the Trig interface while sending consistent synchronous trigger acquisition signals to respective cameras 2;

step B: performing system calibration during first operation when the arrangement of the cameras 2 is completed; then, shooting an image respectively in an initial position and a maximum stroke position of the wave making paddles 7; conducting image binarization and round target extraction on the collected images by the EtherCAT image processing boards 3; establishing a lookup table for motion image information of each wave making paddle 7; recording a ratio $K_i$ of a physical distance of a motion stroke of the wave making paddle 7 to an image plane distance, $i=1, 2, ---, N$, wherein N is the quantity of the wave making paddles 7 on an image plane; simultaneously recording a motion range of the round fluorescent mark points 5 as well as image coordinates at a starting point and a terminal point of a moving track of a center mark point; numbering each wave making paddle 7 on the image plane in an order from left to right, and storing the calibration information in storage spaces of the EtherCAT image processing boards 3 according to the numbers;

step C: conducting image acquisition for the site of the current time; then, collecting image data in the EtherCAT image processing boards 3 by FPGA into a storage unit; later, conducting data processing on the images in the storage regions by DSP on the plates; firstly, extracting all the mark points within the motion range of each wave making paddle; then distinguishing each extraction point on a motion section line of the center mark point recorded in a calibration process; considering the point as a correct mark point only when an adjacent point exists respectively on the top, bottom, left and right of the current point; next, subtracting the recorded initial position from the coordinate of the mark point, thereby obtaining image displacement of motion of the wave making paddle 7; subsequently multiplying the value by Ki to obtain a physical displacement value; obtaining displacement information of each wave making paddle 7 on each image after completing image analysis of each wave making paddle 7; and finally, constructing a sub-message by the EtherCAT image processing boards 3 for the motion information of the wave making paddles 7 in the images in a manner of 'numbers &displacement', and feeding back the sub-message to the computer 1 through the EtherCAT network;

step D: extracting, by the computer 1, messages transmitted by image processing cards; and renumbering the data in the messages according to the numbers of the slave station so that the number of the push plate motion information of each wave maker 7 is unique and each wave maker is successively arranged in accordance with a spatial position relationship;

step E: analyzing the displacement information of the wave making paddle 7 by the computer 1: arranging the displacement data of each wave making paddle 7 in the order of the numbers to form a measurement data curve; and meanwhile, calculating a difference value between a measured data curve and a target data curve at the current time, counting a maximum difference value and a mean difference value and drawing an error curve for operation of each wave making paddle 7 for facilitating an experimenter in detecting the control precision of the wave maker;

step F: repeating step C to step E until the measurement of wave making motion is ended.

In conclusion, the round fluorescent mark points 5 is firstly arranged on the connecting plates 6 of the wave making paddles 7 before measurement; then the cameras 2 are arranged directly above the wave maker and system calibration is conducted; next, measurement is started; during measurement, discrimination and center extraction of the mark points are conducted through the EtherCAT image processing boards 3; next, the displacement is calculated through the calibration parameters and is transmitted to the computer 1 through the EtherCAT network for numbering; and finally, the measured data and the target data are contrasted in the computer 1, thereby obtaining motion control information of the wave making paddles 7.

The invention claimed is:

1. A motion measurement apparatus applied to a large multi-paddle wave simulation system, the motion measurement apparatus comprising a computer, cameras, infrared light supplementing apparatuses, round fluorescent mark points and EtherCAT image processing circuit boards, wherein the cameras are infrared enhanced industrial cameras with fixed focus lenses, and the quantity of the cameras is determined by a measurement range; the quantity of the infrared light supplementing apparatuses is determined by the needs of imaging conditions; and the quantity of the EtherCAT image processing boards is consistent with the quantity of the cameras;

the motion measurement apparatus adopts a data acquisition structure based on EtherCAT network; the computer is used as a master station of the EtherCAT network; the cameras are arranged above a wave making system; under the condition of satisfying the requirement for measurement precision, a field of view covers all wave making paddles; when a single camera cannot cover a measured region, a manner that a plurality of cameras are operated jointly is adopted; each camera is connected with each EtherCAT image processing board through a Camera Link interface as a slave station of the EtherCAT network; a Trig interface of each EtherCAT image processing board is mutually connected together; the first EtherCAT image processing board is connected with the computer through a RJ45 network interface; the EtherCAT image processing board of each camera is mutually connected together through the RJ45 network interface; the infrared light supplementing apparatuses are put at one side of the cameras for illuminating the site; the quantity of the infrared light supplementing apparatuses is selected according to the site imaging quality; and the round fluorescent mark points are pasted or smeared on connecting paddles of the wave making paddles.

2. The motion measurement apparatus according to claim 1, wherein the infrared light supplementing apparatuses are 850 nm infrared light supplementing lamps.

3. A motion measurement method applied to a large multi-paddle wave simulation system, comprising the following steps:

step A: installing the cameras directly above the wave maker; selecting the quantity of the cameras according to measurement precision, camera resolution and the measurement range; connecting the EtherCAT image processing boards mutually and then connecting with the computer to form a data acquisition structure based on EtherCAT network; fixing the round fluorescent mark points to the connecting paddles above the wave making paddles; arranging four auxiliary identification points in a 4-neighborhood arrangement manner, i.e., along the axial operation direction of the wave making paddles at places which allow the same distance from the top, the bottom, the left and the right of the mark points; adjusting the positions of the cameras so that the arrangement directions of the mark points are consistent with the row and column directions of a shot image; disposing the cameras to be an external triggering mode through the EtherCAT image processing boards; and unifying trigger signals by the EtherCAT image processing boards through the Trig interface while sending consistent synchronous trigger acquisition signals to respective cameras;

step B: performing system calibration during first operation when the arrangement of the cameras is completed; shooting an image respectively in an initial position and a maximum stroke position of the wave making paddles; conducting image binarization and round target extraction on the connected images by the EtherCAT image processing boards; establishing a lookup table for motion image information of each wave making paddle; recording a ratio of a physical distance of a motion stroke of the wave making paddle to an image plane distance, wherein N is the quantity of the wave making paddles on an image plane; simultaneously recording a motion range of the mark points as well as image coordinates at a starting point and a terminal point of a moving track of a center mark point; numbering each wave making paddle on the image plane in an order from left to right, and storing the calibration information in storage spaces of the image processing boards according to the numbers;

step C: conducting image acquisition for the site of the current time; collecting image data in the EtherCAT image processing boards by FPGA into a storage unit; then, conducting data processing on the images in the storage regions by DSP on the EtherCAT image processing boards; firstly, extracting all the mark points within the motion range of each wave making paddle; then distinguishing each extraction point on a motion section line of the center mark point recorded in a calibration process; considering the point as a correct mark point only when an adjacent point exists respectively on the top, bottom, left and right of the current point; next, subtracting the recorded initial position from the coordinate of the mark point, thereby obtaining image displacement of motion of the wave making paddle; subsequently multiplying the value by $K_i$ to obtain a physical displacement value; obtaining displacement information of each wave making paddle on each image after completing image analysis of each wave making paddle; and finally, constructing a sub-message by the EtherCAT image processing boards for the motion information of the wave making paddles in the images in a manner of 'numbers & displacement', and feeding back the sub-message to the computer through the EtherCAT network;

step D: extracting, by the computer, messages transmitted by image processing cards; and renumbering the data in the messages according to the numbers of the slave station so that the number of the push paddle motion information of each wave maker is unique and each wave maker is successively arranged in accordance with a spatial position relationship;

step E: analyzing the displacement information of the wave making paddle by the computer: arranging the displacement data of each wave making paddle in the order of the numbers to form a measurement data curve; and meanwhile, calculating a difference value between a measured data curve and a target data curve at the current time, counting a maximum difference value and a mean difference value and drawing an error curve for operation of each wave making paddle for facilitating an experimenter in detecting the control precision of the wave maker;

step F: repeating step C to step E until the measurement of wave making motion is ended.

\* \* \* \* \*